United States Patent [19]

Braun et al.

[11] 4,105,110
[45] Aug. 8, 1978

[54] DOUBLE CHAIN CONVEYOR CONSTRUCTION

[75] Inventors: Ernst Braun; Gert Braun, both of Essen, Germany

[73] Assignee: Halbach & Braun, Germany

[21] Appl. No.: 780,460

[22] Filed: Mar. 23, 1977

[30] Foreign Application Priority Data

Apr. 29, 1976 [DE] Fed. Rep. of Germany ....... 2618798

[51] Int. Cl.$^2$ ............................................. B65G 19/24
[52] U.S. Cl. .................................... 198/731; 198/728
[58] Field of Search ............... 198/725, 728, 729, 730, 198/731, 733, 734, 735

[56] References Cited

U.S. PATENT DOCUMENTS

| | | | |
|---|---|---|---|
| 3,399,757 | 9/1968 | Braun et al. | 198/733 |
| 3,869,039 | 3/1975 | Temme et al. | 198/733 |
| 3,955,666 | 5/1976 | Braun et al. | 198/731 |
| 4,027,793 | 6/1977 | Lampl et al. | 198/731 |

FOREIGN PATENT DOCUMENTS

| | | | |
|---|---|---|---|
| 1,048,224 | 12/1958 | Fed. Rep. of Germany | 198/731 |
| 1,506,979 | 3/1969 | Fed. Rep. of Germany | 198/725 |
| 2,160,027 | 6/1973 | Fed. Rep. of Germany | 198/733 |
| 2,219,107 | 10/1973 | Fed. Rep. of Germany | 198/731 |
| 2,319,917 | 11/1973 | Fed. Rep. of Germany | 198/733 |
| 2,359,605 | 11/1974 | Fed. Rep. of Germany | 198/731 |

*Primary Examiner*—Bruce H. Stoner, Jr.
*Assistant Examiner*—Richard K. Thomson
*Attorney, Agent, or Firm*—McGlew and Tuttle

[57] ABSTRACT

A double chain conveyor which is adapted to run in a conveyor trough which has a trough bottom in which it is guided, comprises first and second chains having interconnected horizontally and vertically arranged links which are adapted to run in the conveyor trough in spaced parallel relationship. The construction includes transversely extending drivers engaged over the chain link which have a central part with seating lugs which extend downwardly into engagement with the trough bottom. The driver also includes side portions on each side including a core which engages over the top and around the outer end of each horizontally disposed chain link to which it is connected. In addition, it has a cutout portion for accommodating the upper part of the vertical chain link which is connected to each side of the horizontal chain link to which it is connected. The construction also includes a yoke member having a bolt portion which extends through a bolt opening on respective sides of the driver and is secured to the driver by a nut member. The yoke includes a bearing arm portion which has a conical surface and which abuts against and supports the feeding lugs of the driver on each side. The yoke member includes, in addition, a bracket portion which extends below and supports the horizontal chain link between adjacent vertical links.

5 Claims, 5 Drawing Figures

DOUBLE CHAIN CONVEYOR CONSTRUCTION

FIELD AND BACKGROUND OF THE INVENTION

This invention relates in general to the construction of conveyors and, in particular, to a new and useful double chain conveyor having drivers which overlie respective aligned horizontal links of two endless chain links which run in parallel relationship in a trough and which also includes a yoke member having a side surface forming a conical support for each side of a seating lip of the driver and a bracket portion which extends below and supports the horizontal chain link.

DESCRIPTION OF THE PRIOR ART

The invention relates in particular to a double chain conveyor with transport chains revolving in a transport trough on the trough bottom thereof, and includes drivers connected to horizontal links by means of yokes. The drivers are braced against the trough bottom in the region between the two transport chains by means of seating lugs and comprise, at chain spacing, a pocket for each lug to receive the associated horizontal link on their underside.

A double chain conveyor is known where the drivers are fastened thereon by means of only one driver common to both transport chains. In this known form of construction, the two transport chains revolve centrally in the trough and include a given space for cleaning (See: German Pat. No. 2,322,898). In contrast thereto, the invention concerns a double chain conveyor where the chains revolve in the transport trough at a maximum distance from each other at the outside. With such double chain conveyors, difficulties continually exist with regard to a satisfactory driver attachment. Thus, drivers are known, for example, with suspension hooks which must be screwed in, as it were, in the horizontal links provided for driver attachment. For other forms of construction, attachment screws with cover plates are provided for the horizontal links. Both known driver attachments are disadvantageous inasmuch as they fail to ensure a satisfactory looping around the chain drums and a firm suspension. Instead, the drivers there tend to lift off, for example, due to underlying rock, so that the driver attachment suffers. This results in deformations in the region of the driver attachment. Moreover, the undivided drivers to be screwed in are disadvantageous inasmuch as they permit attachment of the transport chains only with the chain bands slackened.

SUMMARY OF THE INVENTION

The present invention provides a double chain conveyor distinguished by a satisfactory driver attachment which can withstand all occurring stresses and itself ensures firm looping around the chain drums.

The invention solves this problem in that each pocket has a chain yoke of its own associated with it, with a bracket for internally embracing the horizontal link resting on the bracket. In addition, each pocket has a claw for externally embracing the horizontal link, and each yoke has a bearing arm with a conical abutment surface for the respective associated seating lug of the driver on its side away from the bracket. The result of these measures of the invention is that the horizontal links provided for the attachment of the drivers are engaged by the driver arms from above and by the associated yokes from below and are fixed therebetween in almost embracing pockets. In this way, an extremely firm suspension for the horizontal links is realized, from which a satisfactory attachment of the driver arms results. Due to the pockets embracing the horizontal links, a deformation of the drivers, especially the driver attachment, no longer presents a problem. This is attributable essentially to the fact that the horizontal links are embedded in the drivers and carried by the yokes precisely in the regions of maximum stress. Another factor is that a satisfactory seating of the drivers on the yokes is ensured in addition to the seating lugs, and as a result of the associated abutment surfaces, an additional mutual bracing takes place. The drivers and yokes are so interengaged that a satisfactory looping around the chain drums is ensured. It is practically impossible that this driver attachment will loosen by itself, much less become undone. Instead, with the construction of the invention, the drives can be installed or removed even when the chain belts are tensioned and a satisfactory driver attachment is realized.

Further features essential to the invention are enumerated below. According to the invention, the bracket and bearing arm are aligned with each other and are arranged at right angles to the lengthwise direction of the chain, while in the transition area between bracket and bearing arm, a screw bolt branches off or extends upward and traverses the driver. The bracket is always longer than the bearing arm, so that substantially eccentric yokes are realized.

The advantages achieved by the invention can be seen essentially in that a double chain conveyor with transport chains revolving in the transport trough on the outside is realized, distinguished by satisfactory driver attachment. Satisfactory driver attachment means firm suspension of the horizontal links provided for the connection of the drivers and also firm attachment of the drivers both in the region of the transport trough and in the looping areas of the chain drums. A pushing up of the drivers on the chain drums is suppressed due to the driver attachment according to the invention. Moreover, the drivers can now be fastened to the transport chains as well as removed therefrom without difficulty while the chain belts are tensioned.

Accordingly, it is an object of the invention to provide a double chain conveyor which includes a transversely extending driver which overlies both chains and has a seating lug which is engageable on the bottom of a trough conveyor and which also includes a yoke member which has a conical side abutment which forms a support for the seating lug and includes a bracket arm which extends below and provides a support for the horizontal chain link.

A further object of the invention is to provide a double chain conveyor which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
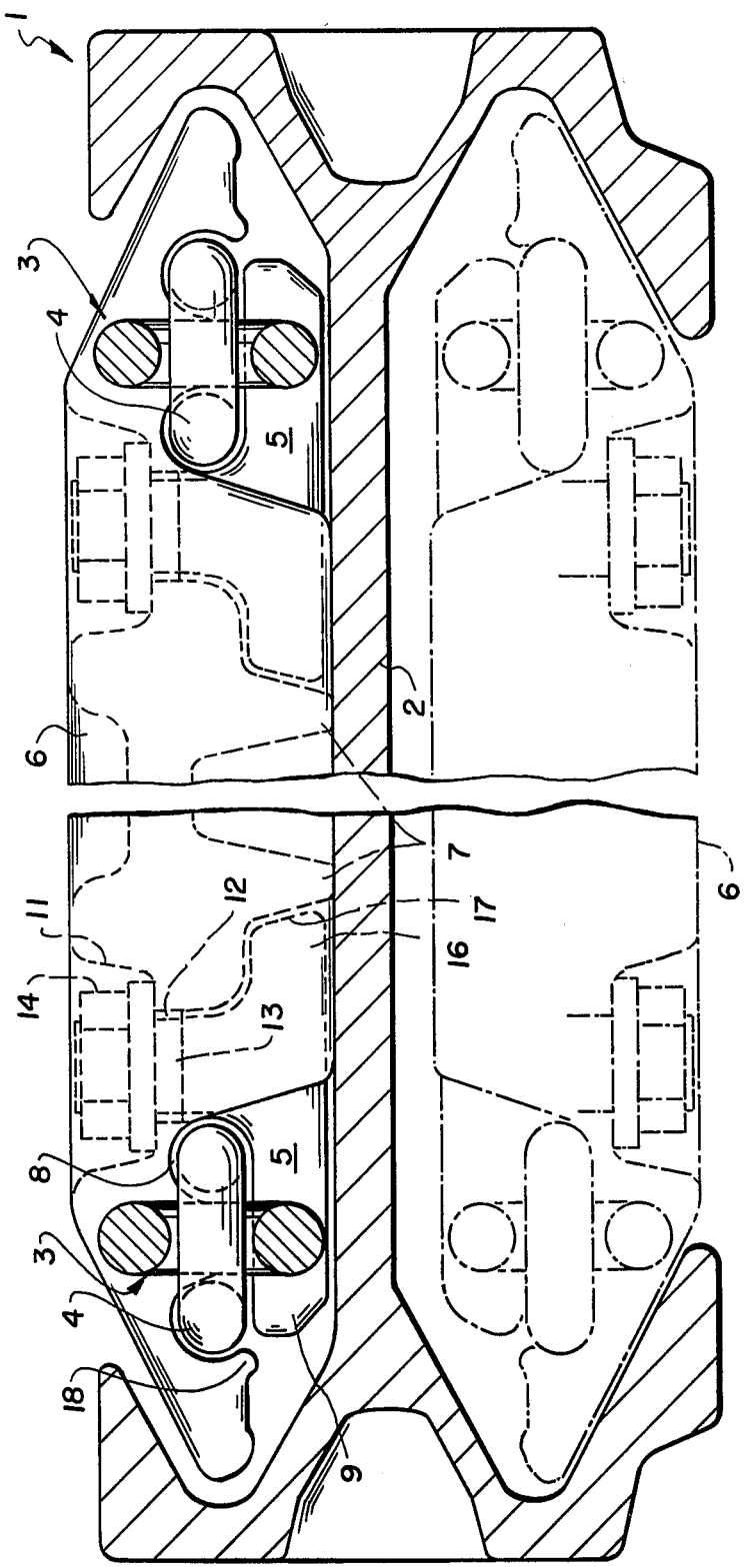
FIG. 1 is a vertical sectional view in the region of a driver attachment through a double chain conveyor constructed in accordance with the invention.
Figure 2:
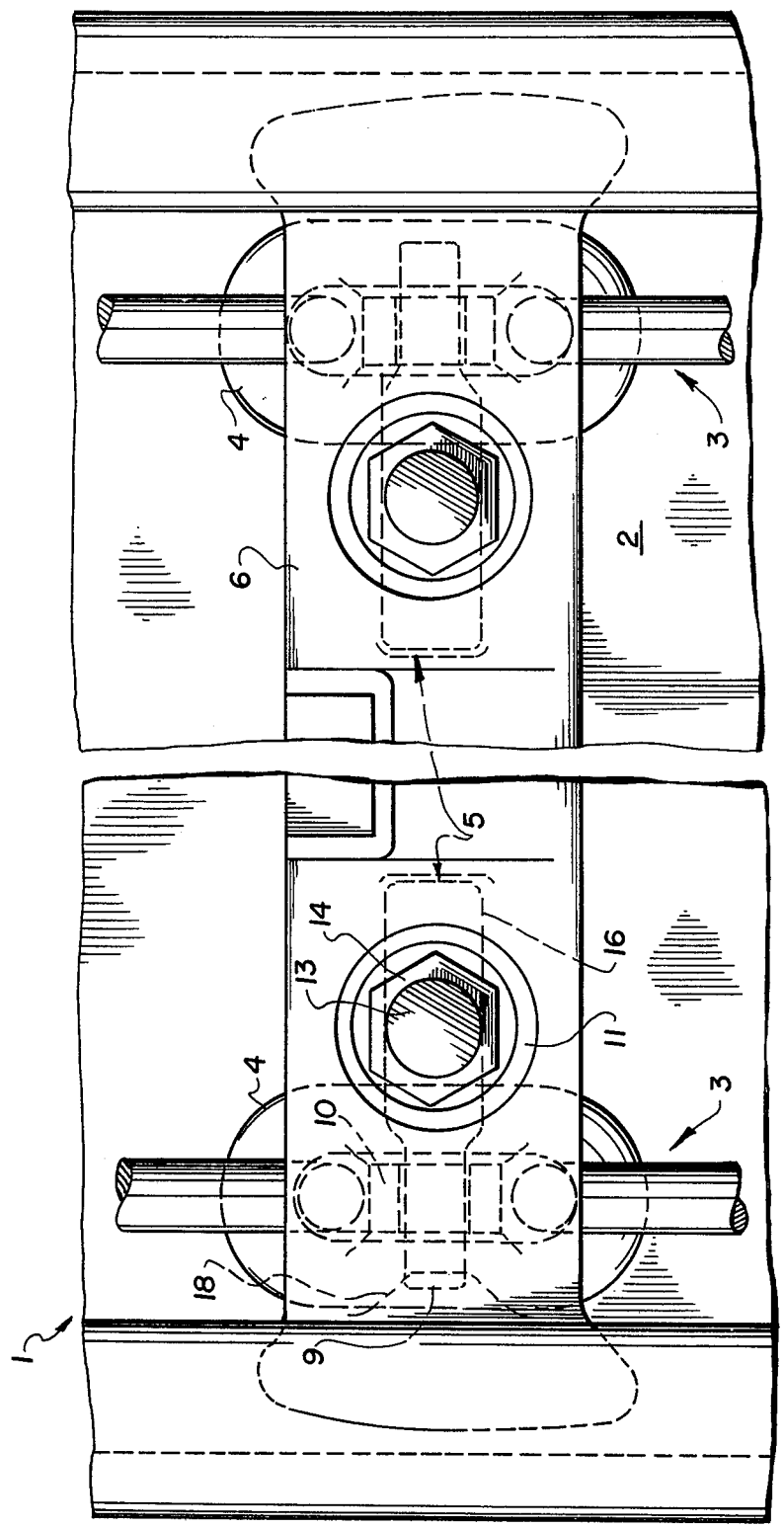
FIG. 2 is a top view of the device shown in FIG. 1.
Figure 3:
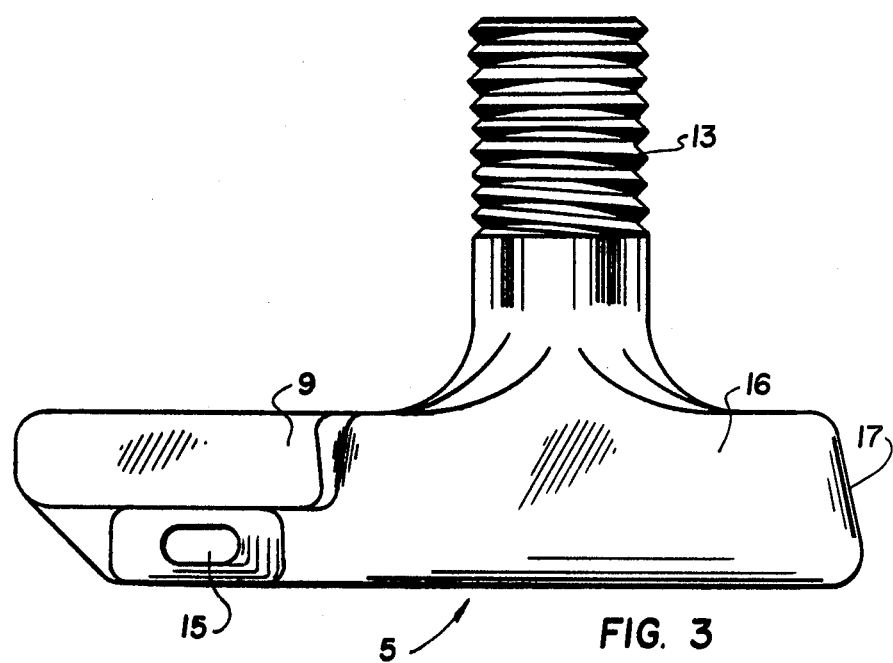
FIG. 3 is a side elevation of a strap for the device according to FIG. 1.
Figure 4:
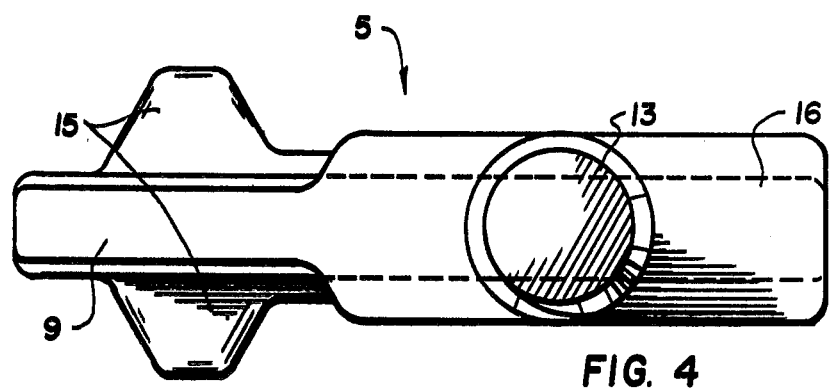
FIG. 4 is a top plan view of the strap shown in FIG. 3.
Figure 5:
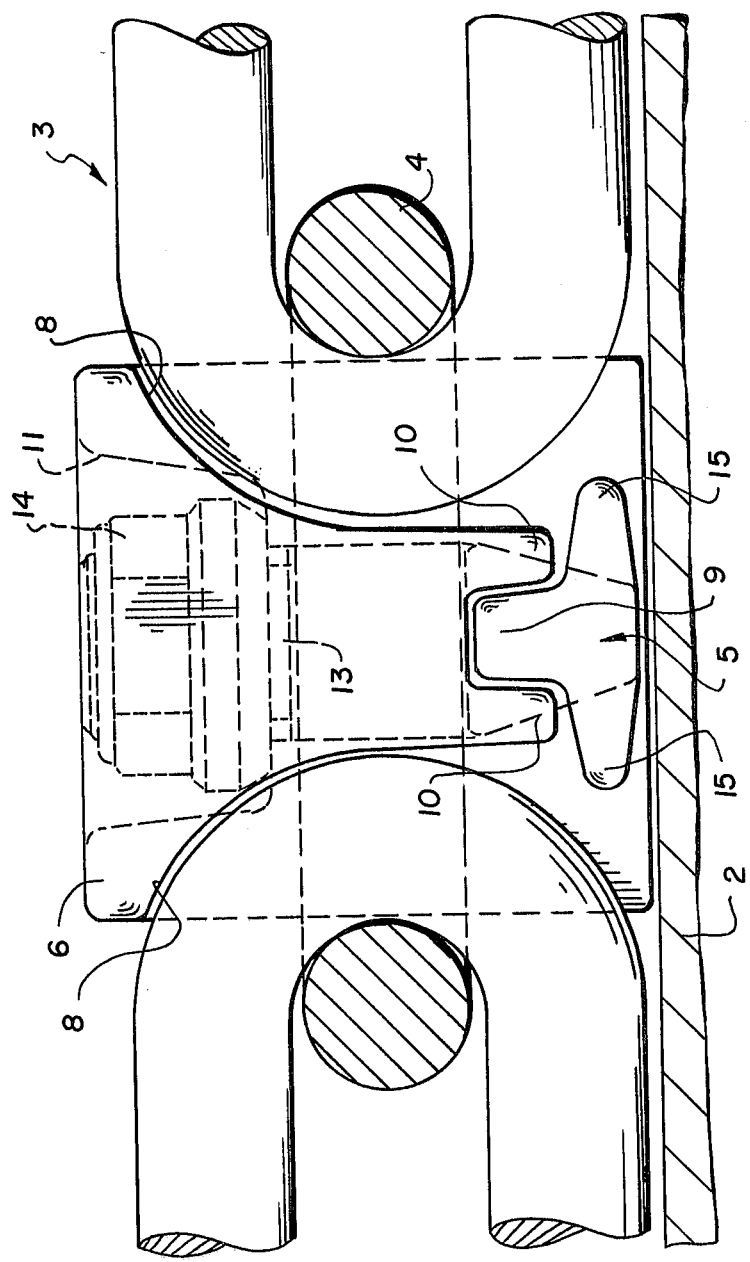
FIG. 5 is a front view of the device shown in FIG. 3.

Referring to the drawings in particular, the invention embodied therein, comprises a double chain conveyor which includes a driver 6 which extends transversely and overlies horizontal link portions 4 of endless chains 3, 3 on each side and also includes seating lug means engageable on a trough bottom 2 of a trough generally designated 1. A yoke member 5 includes a bolt portion 13 which extends through an opening 12 of each side of the driver 6 and it is secured thereto by a nut 14. Yoke member 5 includes an arm portion 16 having a side conical abutment surface which bears against a similar surface of seating lug means in the form of two spaced apart seating lugs 7, 7. Yoke member 5 also includes a bracket arm portion 9 which engages beneath and supports the horizontal link 4 at a location between two adjacent vertical links as shown in FIG. 2.

The conveyor comprises a double chain conveyor with transport chains 3 revolving in a transport trough 1 on the trough bottom 2 thereof, and has drivers 6 connected to horizontal links 4 by means of yokes 5. In the region between the two transport chains 3, the drivers 6 are braced against the trough bottom 2 by means of seating lugs 7. On their underside, the drivers 6 each have at chain spacing a cutout 8 to receive the associated horizontal link 4. Each cutout 8 has associated with it a yoke 5 of its own with a bracket 9 for the seating of the horizontal link 4. Cutout 8 with claw 18 and bracket 9 thereby form a pocket enclosing the horizontal link 4 in cross-section. Drivers 6 have hooked noses 10 in the region of pockets 8, which engage through the horizontal links 4 and around brackets 9 of yokes 5. In the region between each pocket 8 for horizontal link 4 and seating lug 7, they possess on their top side, a recess 11 with a vertical bore 12 for the countersunk uptake of a screw bolt 13 with lock nut 14 for the respective yoke 5. Brackets 9 of yokes 5 possess bearing enlargements 15 extending on both sides in the longitudinal direction of the chain and resting against the trough bottom 2. On their side away from the bracket 9, the yokes 5 have a bearing arm 16 with conical abutment surface 17 for the respective associated seating lug 7 of the driver 6. The bracket 9 and bearing arm 16 are aligned and are arranged at right angles to the longitudinal direction of the chain. In the transition region between bracket 9 and bearing arm 16, the screw bolt 13 branches off or extends upward, so that the yoke 5 has the form of an inverted T. The bracket 9 is longer than the bearing arm 16.

While a specific embodiment of the invention has been shown and described in detail to illustrate the application of the principles of the invention, it will be understood that the invention may be embodied otherwise without departing from such principles.

What is claimed is:

1. A double chain conveyor adapted to run in a conveyor trough having a trough bottom on which it is guided, comprising first and second spaced apart chains having interconnected generally horizontally and vertically arranged links and being adapted to run in a conveyor trough in spaced parallel relationships, a transversely extending driver having central seating lug means engageable on the trough bottom with a side surface extending laterally on each side and having a side portion on each side engageable over a portion of a horizontally arranged link and a portion of two adjacent vertically arranged links which are engaged with the horizontal link, said driver also having a substantially vertically extending bolt receiving opening therethrough on each side inwardly of said first and second chains, a yoke member having a bolt portion engageable in a respective bolt receiving opening on each side, each yoke member having a base portion engageable on the trough bottom with a laterally extending bracket part extending between adjacent vertically arranged links and providing a support for the horizontally arranged link, said yoke member also including a laterally extending arm portion extending in an opposite direction from said bracket part in respect to said bolt portion and having a lateral support surface engageable with a respective seating lug side surface.

2. A double chain conveyor, according to claim 1, wherein said bracket arm portion and said bearing arm portion are transversely aligned and disposed at right angles to the longitudinal direction of motion of the chain, said bolt portion being disposed between said bracket arm and said bearing arm and being threaded at its upper side and a nut member secured to said bolt portion over said driver.

3. A double chain conveyor, according to claim 1, wherein said bracket part is longer than said arm part.

4. A double chain conveyor, according to claim 1, wherein said driver includes a claw portion extending around the exterior periphery of each horizontal chain on each side of said driver.

5. A double chain conveyor, according to claim 1, wherein said seating lug means of said driver comprises two transversely spaced apart seating lugs having bottom surfaces engageable with the trough bottom, the exteriorly facing surface of each of said lugs being conically formed, said arm part of said yoke member having a conically formed side surface engageable with the conically formed surface of the associated seating lug portion.

* * * * *